United States Patent [19]

Tomoshige et al.

[11] Patent Number: 4,966,929

[45] Date of Patent: Oct. 30, 1990

[54] COMPOSITION HAVING DAMPING PROPERTY, DAMPING MEMBER, PROCESS FOR PREPARATION OF DAMPING MEMBER AND METHOD OF USING DAMPING MEMBER

[75] Inventors: Toru Tomoshige; Yasumasa Fujii; Youhei Suzuki, all of Ichihara; Kenji Yokoyama, Kawasaki; Yoshio Iida, Yokohama, all of Japan

[73] Assignees: Mitsui Petrochemical Ind., Ltd.; NEC Environment Engineering, Ltd., both of Tokyo, Japan

[21] Appl. No.: 381,201

[22] Filed: Jul. 18, 1989

[30] Foreign Application Priority Data

Jul. 18, 1988 [JP] Japan .................................. 63-176957

[51] Int. Cl.⁵ .............................................. C08L 95/00
[52] U.S. Cl. ........................................ 524/71; 524/62; 523/351; 428/220
[58] Field of Search ..................... 524/62, 71; 523/351; 428/220

[56] References Cited

U.S. PATENT DOCUMENTS 3,994,845  11/1976  Blackford .......................... 524/496
4,623,586  11/1986  Umeya et al. ..................... 524/495

OTHER PUBLICATIONS

Abstract, Japanese Patent 56-157448, Sano et al., 12/81.
Abstract, Japanese Patent 62-20542, Sato et al., 1/87.

*Primary Examiner*—Melvyn I. Marquis
*Attorney, Agent, or Firm*—Sherman and Shalloway

[57] ABSTRACT

Disclosed is a damping member comprising, as main components, a petroleum resin, asphalt and mica. By selecting and using mica as the filler and incorporating mica in an amount smaller than the amount of asphalt, the adhesion follow-up property to a substrate can be improved.

This damping material can be attached simply and assuredly to a substrate having a curved surface, such as a tube or pipe, an air-conditioning duct or a part of a building or vehicle by heat-pressing or heat-fusion-bonding, and a product having an excellent damping effect is provided.

17 Claims, 1 Drawing Sheet

COMPOSITION HAVING DAMPING PROPERTY, DAMPING MEMBER, PROCESS FOR PREPARATION OF DAMPING MEMBER AND METHOD OF USING DAMPING MEMBER

BACKGROUND OF THE INVENTION (1) Field of the Invention

The present invention relates to a composition having a damping property and a damping member formed from this composition. More particularly, the present invention relates to a composition having a damping property, which comprises a petroleum resin and, incorporated therein, specific amounts of asphalt and mica, and a damping member for absorbing the vibrational energy of a building, a vehicle or the like, which is formed by molding this composition and is excellent in the adhesion follow-up property to convexities and concavities on a substrate.

(2) Description of the Related Art

It has been known that an asphalt composition is used for the production of a damping member for damping various vibrations and shocks, especially the vibrational energy in a building or vehicle.

By "damping", it is meant that a dynamic energy at deformation of a body is reduced by converting it to a thermal energy, and it is known that the damping member exerts functions of (1) reducing the amplitude at the time of resonance to reduce the emission of a sound and the stress, (2) reducing the propagation of a sound in a solid and the propagation of a vibrational energy and (3) damping a free vibration to reduce a shock sound.

As the damping method most widely adopted for attaining a damping effect in a vibration-generating structural element such as a building or vehicle, there can be mentioned a method in which a polymeric viscoelastic material such as asphalt is coated on the surface of a construction material. Examples of this method are disclosed in Japanese Patent Publication Nos. 52-50522 and 56-5469. Each of the inventions disclosed in these patent publications is characterized in that a specific additive is incorporated in asphalt used as the damping material to increase the damping loss coefficient of the asphalt.

Furthermore, Japanese Unexamined Patent Publication No. 57-29702 discloses a damping water-proof coating material comprising asphalt as the main component and mica having an aspect ratio of at least 90, which is dispersed in the asphalt so that the mica is oriented in the form of multiple layers, and Japanese Unexamined Patent Publication No. 58-28034 discloses a damping member prepared by scattering particles comprising a binder composed of asphalt and/or a thermoplastic synthetic resin as the main component and a rubber component and/or a wax as the modifier component, and at least one filler selected from the group consisting of fibrous fillers, powdery fillers and scaly fillers on a substrate and forming a sheet-like damping layer by a thermal or physical operation. Furthermore, Japanese Unexamined Patent Publication No. 52-39723 discloses a damping material comprising 60 to 80 parts by weight of asphalt, 3 to 9 parts by weight of a petroleum resin and 5 to 15 parts by weight of an organic staple fiber.

However, these conventional damping materials are defective in that since the asphalt content is high, the damping performance is not sufficient, the adjustment of the damping performance peak temperature is difficult, an inherent smell of asphalt is generated by heating at the kneading and applying steps and the handling is difficult and troublesome.

SUMMARY OF THE INVENTION

It is therefore a primary object of the present invention to provide a damping composition having a high damping performance, in which generation of an asphalt smell at the kneading and applying steps is controlled to a low level.

Another object of the present invention is to provide a damping member obtained by molding the above composition, which is excellent in the adhesion followup property to a substrate, i.e. the adhesion between the damping member and a substrate to which the damping member is applied.

We made research with a view to attaining these objects, and we completed the present invention characterized in that a petroleum resin, asphalt and mica are mixed at a specific ratio. Namely, the present invention is based on the finding that if the ratio of a petroleum resin (hydrocarbon resin) in a damping composition is adjusted to 10 to 50% by weight, a composition having an excellent damping performance is obtained and if mica is selected as the filler and is incorporated in an amount smaller than the amount incorporated of asphalt, a damping member having an excellent adhesion follow-up property is obtained.

More specifically, in accordance with the present invention, there is provided a damping composition comprising 100 parts by weight of a petroleum resin, 100 to 500 parts by weight of asphalt and 90 to 400 parts by weight of mica, the amount incorporated of mica being smaller than the amount incorporated of asphalt. Furthermore, a damping member molded from this composition and a process for the preparation are provided. The damping member is obtained in the form of a light sheet excellent in the adhesion follow-up property. Accordingly, the damping member can be attached to a substrate having a curved surface by a simple method in which the damping member is heat-pressed or heat-fusion-bonded to the substrate.

In the present invention, an especially excellent damping property can be obtained when the petroleum resin is an isopropenyltoluene type petroleum resin or an aromatic petroleum resin.

DETAILED DESCRIPTION OF THE PREFERRED EMBODIMENTS

Figure 1:
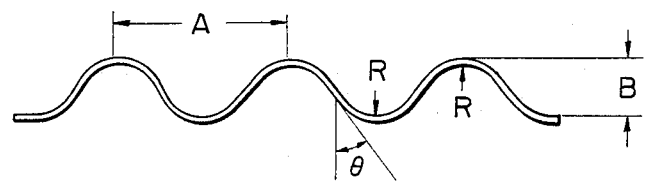
FIG. 1 is a sectional view illustrating a steel substrate used for measuring the adhesion follow-up property of the damping member of the present invention.

As the petroleum resin (hydrocarbon resin) that can be used in the present invention, there can be used a resin having a softening point of 30° to 140° C., which is obtained by polymerizing isopropenyltoluene alone, or by copolymerizing 100 parts by weight of isopropenyltoluene with up to 100 parts by weight, preferably 5 to 100 parts by weight of a fraction selected from fractions containing unsaturated hydrocarbon fractions having 4 and/or 5 carbon atoms ($C_4$ and/or $C_5$ fractions), obtained as by-products at refining and cracking of petroleum, in the presence of a Friedel-Crafts catalyst. Furthermore, there can be used a resin having a softening point of 80° to 120° C., which is obtained by polymerizing the abovementioned $C_4$ and $C_5$ fractions in the presence of a Friedel-Crafts catalyst, a resin having a softening point of 40° to 160° C., which is obtained by cation-polymerizing or heat-radical-polymerizing an optional fraction having a boiling point of −10° to 280° C., which is formed as a by-product at cracking or modification of petroleum, in the presence of a Friedel-Crafts catalyst, and modification products of these resins, for example, aromatic hydrocarbon resins (aromatic petroleum resins) obtained by polymerizing fractions having a boiling point of 140° to 280° C., which are composed mainly of aromatic unsaturated hydrocarbons having 9 carbon atoms such as styrene, indene, vinyltoluene, ($C_9$ fractions), for example, in the presence of a Friedel-Crafts catalyst. Still further, there can be mentioned aliphatic petroleum resins obtained by polymerizing fractions having a boiling point of −10° to 20° C., which contain, as the main component, olefins and diolefins having 4 carbon atoms ($C_4$ fractions), or fractions having a boiling point of 15° to 60° C., which contain, as the main component, olefins and diolefins having 5 carbon atoms ($C_5$ fractions), in the presence of a Friedel-Crafts catalyst, resins obtained by mixing $C_9$ fractions with $C_4$ fractions and/or $C_5$ fractions and copolymerizing the mixture in the presence of a Friedel-Crafts catalyst, resins obtained by copolymerizing or heat-polymerizing $C_9$ fractions with cyclic diolefins such as dicyclopentadiene in the presence of a Friedel-Crafts catalyst, resins obtained by copolymerizing vinyl aromatic hydrocarbons such as styrene or α-methylstyrene with $C_4$ and $C_5$ fractions in the presence of a Friedel-Crafts catalyst, modified aromatic petroleum resins obtained by modifying the abovementioned resins with an α,β-unsaturated carboxylic acid or an anhydride thereof, or hydrogenating the above-mentioned resins, isopropenyltoluene type petroleum resins, and aliphatic petroleum resins. Of these petroleum resins, an isopropenyltoluene resin having a softening point (ring and ball method) of 80° to 140° C. and an aromatic petroleum resin having a softening point of 80° to 150° C. are preferred because an especially excellent damping effect can be attained.

Isopropenyl type petroleum resins especially preferably used in the present invention have the following physical properties.

(a) Softening point (ring and ball method): 30° to 140° C. (preferably 70° to 125° C.)
(b) Bromine value: 3 to 20
(c) Number average molecular weight: 500 to 1,200
(d) Hue: Gardner value (melting method) 1 to 5
(e) Other properties: Volatile components less than 3% (resulting in a lack of an offensive odour)

Aromatic hydrocarbon (petroleum) resins especially preferably used in the present invention have the following physical properties.

(a) Softening point (ring and ball method): 80° to 150° C. (preferably 80° to 120° C.)
(b) Bromine value: 10 to 60
(c) Number average molecular weight: 300 to 2500 (preferably 400 to 1500)
(d) Hue: Gardner value (melting method) 3 to 14

In the damping composition of the present invention comprising a petroleum resin as mentioned above, the damping peak value at room temperature to 40° C. is larger than 11%. Since the damping peak value within this temperature range is large, the composition can be preferably used as the damping material for buildings, vehicles and the like.

The above-mentioned petroleum resins can be prepared according to known processes. For example, the abovementioned petroleum resins obtained from isopropenyltoluene or from isopropenyltoluene and $C_4$ and $C_5$ fractions can be prepared according to the following processes.

As the isopropenyltoluene, there can be used ortho-, meta- and para-isomers, and mixtures thereof, and a mixture comprising 20 to 60% of the para-isomer, 40 to 80% of the meta-isomer and 0 to 10% of the ortho-isomer is especially preferred. Isopropenyltoluene having a purity of at least 80% by weight and containing a minor amount of a polymerizable monomer such as styrene, vinyltoluene or α-methylstyrene can be used.

Fractions ($C_4$ and $C_5$ fractions) containing unsaturated hydrocarbon having 4 or 5 carbon atoms, which are formed as by-products at refining or cracking of petroleum are fractions having a boiling point of from −15° to +45° C. under atmospheric pressure and containing polymerizable monomers such as 1-butene, isobutylene, 2-butene, 1,3-butadiene, 1-pentene, isoprene, 2-methyl-1-butene, 3-methyl-1-butene, 2-pentene, isoprene, 1,3-pentadiene and cyclopentadiene. Optional fractions containing polymerizable monomers selected from $C_4$ and $C_5$ fractions, $C_4$ formed by removing butadiene, and $C_5$ fractions formed by removing isoprene and cyclopentadiene can be polymerized in an amount of up to 100 parts by weight with 100 parts by weight of isopropenyltoluene.

A catalyst generally known as a Friedel-Crafts catalyst is used for the copolymerization. For example, there can be mentioned aluminum chloride, aluminum bromide, dichloromonoethyl aluminum, titanium tetrachloride, tin tetrachloride and various complexes of boron trifluoride. It is preferred that the catalyst be used in an amount of 0.1 to 3.0% by weight, especially 0.5 to 1.5% by weight, based on the starting material.

In the copolymerization, the unsaturated hydrocarbons contained in the $C_4$ and $C_5$ fractions act as solvents, but in order to remove the reaction heat and control the viscosity of the polymerization liquid, it is preferred that the initial concentration of the polymerizable monomers be adjusted to 30 to 50% by weight by using a solvent. As preferred examples of the solvent, there can be mentioned aliphatic hydrocarbons such as pentane, hexane, heptane and octane, alicyclic hydrocarbons such as cyclopentane, cyclohexane and methylcyclohexane, aromatic hydrocarbons such as toluene, xylene, ethylbenzene and mesitylene, and mixtures thereof.

The polymerization temperature is changed according to the composition of the starting material, but generally, the polymerization temperature is selected within the range of from −50° to 70° C., preferably −50° to 50° C.

The polymerization can be carried out either batchwise or in a continuous manner. Furthermore, a multi-staged polymerization process can be adopted.

After termination of the polymerization, the catalyst is decomposed by an aqueous solution of an alkali, methanol or the like, and the reaction product is washed with water and the unreacted oil and solvent are removed to obtain an intended resin having a softening point of 30° to 140° C. (ring and ball method).

As the asphalt used in the present invention, there can be mentioned straight asphalt, blown asphalt (air-blown asphalt), a mixture comprising 50 to 80% by weight of blown asphalt (air-blown asphalt) and 50 to 20% by weight of straight asphalt, and asphalt for water protection works, such as oil-modified (oils and fats modified) blown asphalt (oil-modified air-blown asphalt), and oil-modified and blown asphalt (oil modified air-blown asphalt) having a penetration value of 20 to 30 is preferably used.

This oil-modified air-blown asphalt can be obtained by incorporating an animal or vegetable oil such as a nondrying animal oil (for example, beef tallow), a drying animal oil (for example, cuttlefish oil), a semi-drying vegetable oil (for example, soybean oil) or a drying vegetable oil (for example, linseed oil), or a fatty acid pitch thereof (for example, rape oil) into air-blown asphalt, or by compounding an oil as mentioned above during the preparation of air-blown asphalt. It is generally preferred that the content of the animal or vegetable oil or the fatty acid pitch in the oil-modified asphalt be 1 to 20% by weight.

The asphalt is incorporated in an amount of 100 to 500 parts by weight, preferably 150 to 400 parts by weight, into 100 parts by weight of the petroleum resin. By thus controlling the amount of asphalt to up to 5 times the amount of the petroleum resin, that is, increasing the proportion of the petroleum resin, the damping performance, that is, the damping value, is increased, and since the asphalt in the composition acts suitably as a plasticizer, the damping peak temperature can be easily adjusted.

Mica used in the present invention is one of inorganic fillers used for the conventional damping materials composed mainly of asphalt. However, if mica is melt-mixed in the petroleum resin, mica shows a synergistically increased damping value not attained by other inorganic fillers, and this effect is especially prominent when mica having an aspect ratio of 50 to 200 and having such a particle size distribution, determined by JIS Z-8801, that at least 80% of the particles are capable of passing through a 50-mesh sieve is used. The mica is incorporated in an amount of 90 to 400 parts by weight, preferably 140 to 300 parts by weight, into 100 parts by weight of the petroleum resin. In order to obtain a damping member having a good adhesion follow-up property to a substrate, it is preferred that the amount incorporated of the mica be smaller than the amount incorporated of the asphalt.

In principle, the composition of the present invention comprises the above-mentioned three components. However, in the case where the damping member is provided in the form of a sheet, in order to impart a more beautiful and smooth appearance, it is preferred that a defoaming agent such as a silicone oil be incorporated in an amount of 0.01 to 0.5 part by weight per 100 parts by weight of the petroleum resin, whereby a composition having an excellent damping performance is obtained. A homogeneous dispersion having a good dispersibility can be obtained in a short time by melt-kneading the petroleum resin with the asphalt in advance and then, kneading the mica and other components with the kneaded mixture.

Melt mixing is accomplished at a temperature of 80° to 200° C., preferably 100° to 160° C., under atmospheric pressure for 10 minutes to 1 hour, preferably 20 to 40 minutes, by a kneading apparatus such as a Brabender equipped with a heating device, a mixing stirrer, a kneader, an extruder or a roll.

In the damping composition obtained according to the present invention, since a large quantity of the petroleum resin is used, an excellent damping value (damping performance) can be attained, and the composition can be handled very easily. This characteristic feature becomes prominent when an isopropenyltoluene type petroleum resin or an aromatic petroleum resin is used.

An inorganic or organic filler, a flame retardant, a pigment, a stabilizer and the like can be incorporated in the damping composition of the present invention, so far as the damping performance is not degraded. As the filler that can be incorporated, there can be mentioned powdery fillers such as talc, clay, calcium carbonate, carbon and zinc oxide, fibrous fillers such as asbestos, glass fibers and carbon fibers, microballoons such as sirasu balloons, silica balloons and phenolic resin balloons, synthetic resins, synthetic fiber flocks and pulp powder, crushed paper. As the flame retardant, there can be mentioned antimony oxide, halogenated aromatic compounds, halogenated aliphatic compounds, magnesium hydroxide, aluminum hydroxide, boron oxide, phosphoric acid esters, red phosphorus, aluminum hydroxide-stabilized red phosphorus, ferrocene, ferrocene derivatives and acetylacetonatoiron. Known inorganic and organic pigments can be used as the pigment. As the stabilizer, there can be mentioned known phenolic and amine antioxidants necessary at the melt-mixing step and known amine type weather-resistant stabilizers necessary when the composition is used as the damping material. These additives can be incorporated singly or in the form of a mixture of two or more of them.

The damping composition of the present invention can be molded into a sheet, a block or a molded article having other shape, and the molded article can be used highly effectively for various machines causing vibrations or noises by rotary or reciprocating movements, housings of these machines, constructions such as bridges, city water and gas conduits, air-conditioning ducts and dampers of various vehicles such as cars.

The damping member of the present invention is generally used in the form of a sheet obtained by kneading the above-mentioned composition by a known kneader such as a two-roll kneader equipped with a heating device, rolling the kneaded composition into a sheet having a thickness of 0.1 to 10 mm by a calender roll and cutting the sheet into a piece having a size of about 1000 mm × about 500 mm. Accordingly, in order to smoothen the surface of the sheet and improving the appearance, it is preferred that a defoaming agent such as a silicone oil be incorporated, as pointed out hereinbefore. As the bonding method, there can be mentioned a heat-pressing method using a roll, a heat-pressing method using a heating blower, a heat-melting-bonding bonding method conducted in the pressureless state and a bonding method using an adhesive. Whether the non-restraint application method or the restraint application method in which a restraint layer is bonded to the damping member may be adopted, an excellent damping performance can be exerted by the damping member of the present invention. Furthermore, since the damping member of the present invention has a very excellent damping performance, a sufficient damping effect is attained even if the damping member is in the form of a sheet having such a small thickness as 1 to 1.5 mm. Accordingly, the damping member is suitably used as a damping member for a panel or the like where reduction of the weight is desired, and a sufficient damping effect can be attained even if the amount used of the damping member is ¼ to 1/5 of the amount used of the conventional asphalt type damping member.

As pointed out hereinbefore, the damping member of the present invention has a large damping value at temperatures of a broad range of 0° to 60° C., and the damping member of the present invention exerts an excellent damping performance at a frequency of 50 Hz to 1 KHz.

Mica incorporated in the damping composition of the present invention increases the damping value in proportion to the amount incorporated of mica, but as pointed out hereinbefore, in order to improve the adhesion follow-up property, which is one of important properties of the damping member, it is preferred that the amount incorporated of mice be always smaller than the amount incorporated of asphalt.

According to the present invention, a damping composition showing an increased damping value at temperatures of a broad range of about 0° to 60° C. is obtained, and a damping member obtained from this composition is excellent in the adhesion follow-up property to a convex concave surface of a substrate. Since a high damping level can be obtained by using this damping member in an amount smaller than the amounts required in case of the conventional damping members, an effect of reducing the weight of a building or vehicle can be attained according to the present invention.

The present invention will now be described in detail with reference to the following examples that by no means limit the scope of the invention.

In the examples, the damping value and adhesion follow-up property were determined according to the following methods.

Damping Value

Figure 2:
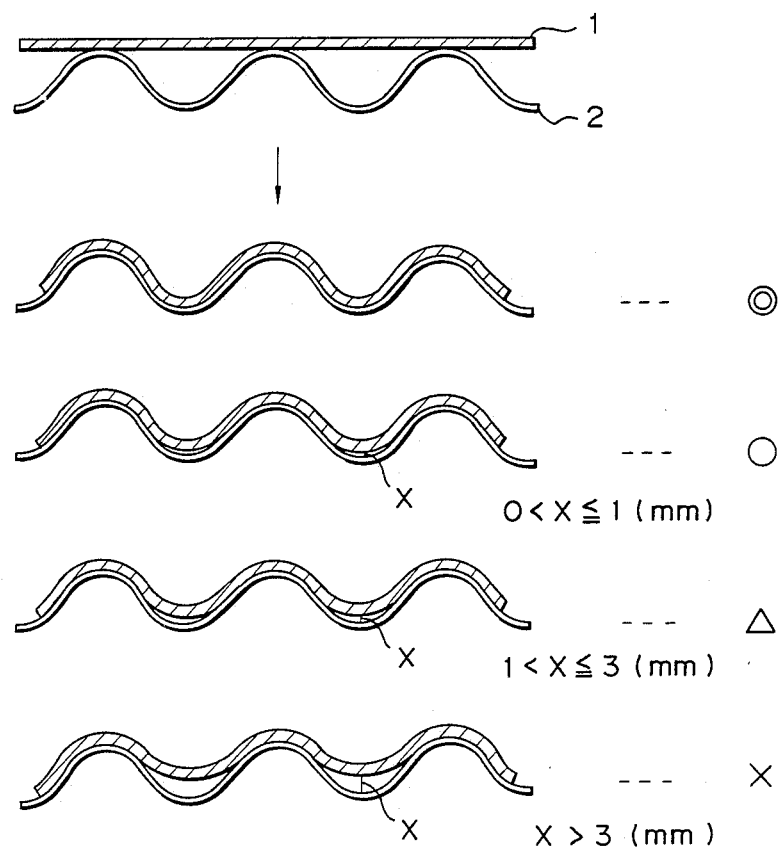
FIG. 2 is a sectional view showing the evaluation of the adhesion follow-up property of the damping member.

According to the two-point-hanging resonance method, the vibration damping ratio (damping value) of the bending primary moment (about 300 Hz) was measured at various temperatures. The maximum value $(C/Cc)_{max}$ of the vibration damping ratio (damping value) and the temperature ($T_{max}$) at which this maximum value was obtained, which were observed when the damping performance of the damping member of the present invention was determined, are shown in Table 1. Adhesion Follow-up Property On a wavy substrate of steel shown in FIG. 1 (span A between tops was 30 mm, inclination angle θ of the wave was 35°, height B of the wave was 10 mm and radius R of the top and bottom of the wave was 8), a damping sheet cut into a size of 200 mm×40 mm was placed, and the sheet was heated at 150° C. for 30 minutes by an oven and the adhesion follow-up property was examined and evaluated according to the following scale as shown in FIG. 2.

◉ : distance X between the bottom of the wave and the bottom of the sheet was zero ○ : a certain space was formed in the bottom (X was larger than 0 but smaller than 1 mm)

△: a considerable space was formed in the bottom (X is not smaller than 1 mm but smaller than 3 mm)

X: the sheet was hardly softened (X was not smaller than 3 mm)

REFERENTIAL EXAMPLE (Preparation of Isopropenyltoluene Type Petroleum Resin)

An autoclave was charged with 100 g of isopropenyltoluene (having a purity of 99.2%) obtained by distillation separation from an acid cleavage product of cymene hydroperoxide in the cymene method cresol preparation process, 10 g of unsaturated hydrocarbon-containing $C_4$ and $C_5$ fractions obtained by thermal cracking of petroleum naphtha and 150 g of toluene, and 1.5 g of a $BF_3$-phenol complex was added dropwise over a period of about 10 minutes at a temperature of 0° C. with stirring. Then, stirring was conducted for 3 hours, and 50 g of a 5% aqueous solution of sodium hydroxide was added and the mixture was violently stirred for 30 minutes to decompose the catalyst. The aqueous layer was separated, and the polymer oil was washed with water until it became neutral. The unreacted oil and toluene as the solvent were removed by distillation and 105 g of a light-yellow bulky resin was obtained as the residue. The composition of the starting monomers and the properties of the obtained resin were as shown below.

Composition of Isopropenyltoluene
o-isopropenyltoluene: 5.3%
m-isopropenyltoluene: 60.4%
p-isopropenyltoluene: 33.5%
cymene: 0.8%
Composition of $C_4$ and $C_5$ Fractions
$C_3$: 1.5%
isobutane: 0.4%
n-butane: 1.3%
1-butene: 10.5%
isobutylene: 19.8%
trans-2-butene: 8.7%
cis-2-butene: 4.4%
1,3-butadiene; 20.9%
n-pentane; 5.1%
isoprene: 5.6%
1,3-pentadiene: 2.8%
cyclopentadiene: 3.1%
others (fractions having boiling point lower than 80° C.): 15.9%
Properties of Resin
hue: 3 (Gardner color scale: ASTM D-154-58)
softening point: 92° C. (rng and ball method)
number average molecular weight: 730
bromine value: 6 (ASTM D-1158-57)

In the examples, the isopropenyltoluene petroleum resin prepared according to the above-mentioned process was used as "petroleum resin A".

AROMATIC PETROLEUM RESINS

The following aromatic petroleum resins were used in the examples.

(1) An aromatic hydrocarbon resin having a softening point of 120° C. (ring and ball method), a Gardner color scale of 10 (melting method), a number average molecular weight of 1000, a bromine value of 40 and a specific gravity of 1.70, which was obtained by polymerizing a fraction composed mainly of aromatic unsaturated hydrocarbons having 9 carbon atoms, obtained at cracking of naphtha (Mitsui Petrosin #120 supplied by Mitsui Petrochemical; "Petroleum Resin B" in the examples)

(2) An aromatic hydrocarbon resin having a softening point of 100° C. (ring and ball method), a Gardner color scale of 13 (melting method), a number average molecular weight of 500, a bromine value of 40 and a specific gravity of 1.07, which was obtained by polymerizing a fraction composed mainly of aromatic unsaturated hydrocarbons having 9 carbon atoms, obtained at cracking of naphtha (Mitsui Petrosin #100 supplied by Mitsui Petrochemical; "Petroleum Resin C" in the examples)

(3) An aromatic hydrocarbon resin having a softening point of 80° C. (ring and ball method), a Gardner color index of 13 (melting method), a number average molecular weight of 450, a bromine value of 40 and a specific gravity of 1.07, which was obtained by polymerizing a fraction composed mainly of aromatic unsaturated hydrocarbons having 9 carbon atoms, obtained at cracking of naphtha (Mitsui Petrosin #80 supplied by Mitsui Petrochemical; "Petroleum Resin D" in the examples).

ALIPHATIC PETROLEUM RESIN

An aliphatic hydrocarbon resin having a softening point of 100° C., a Gardner color scale of 9 (melting method), a number average molecular weight of 1100, a bromine value of 35 and a specific gravity of 0.97, which was obtained by polymerizing a fraction composed mainly of aliphatic unsaturated hydrocarbons comprising aliphatic olefins and diolefins, obtained at thermal cracking of naphtha (Hirez G-100X supplied by Mitsui Petrochemical; "Petroleum Resin E" in the examples)

Asphalts

Asphalt A: oil-modified blown asphalt (air-blown asphalt) (penetration value=20/30)

Asphalt B: straight asphalt (penetration value=80/100

Asphalt C: blown asphalt (air-blown asphalt) (penetration value=20/30)

Mica

Mica having an aspect ratio of 50 to 200 and such a particle size distribution, determined according to JIS Z-8801, that at least 80% of the particles were capable of passing through a 50-mesh sieve.

EXAMPLES 1 THROUGH 9 and COMPARATIVE EXAMPLES 1 THROUGH 3

With respect to each of compositions shown in Table 1, predetermined amounts of the petroleum resin and asphalt were charged into a two-roll kneader (supplied by Ashizawa) heated at 110° C. and were kneaded. When the kneaded components began to melt, mica was gradually added. In the case where a silicone oil was added, this addition was effected simultaneously with the addition of the mica. The composition was sufficiently molten and kneaded for about 15 minutes to obtain a homogeneous melt kneaded mixture, and the roll kneading was stopped at this point.

Then, the kneaded mixture was supplied to a calender roll while cooling the melt, and a damping sheet having a thickness of 2 mm was formed. The sheet was cut into a test piece having a size of 32 mm×300 mm, and the test piece was subjected to the tests for determining the physical properties.

The obtained results are shown in Table 1.

TABLE 1

| Composition (parts by weight) | Example No. | | | | | | | | | Comparative Example No. | | |
|---|---|---|---|---|---|---|---|---|---|---|---|---|
| | 1 | 2 | 3 | 4 | 5 | 6 | 7 | 8 | 9 | 1 | 2 | 3 |
| petroleum resin A | 100 | | | | | | | | 100 | | | |
| petroleum resin B | | 100 | | | | | | | | | | |
| petroleum resin C | | | 100 | | | | | | | | | |
| petroleum resin D | | | | 100 | 100 | 100 | 100 | | | 100 | 100 | 100 |
| petroleum resin E | | | | | | | | 100 | | | | |
| asphalt A | 150 | 150 | 150 | 400 | 150 | | | 150 | 400 | 150 | 100 | 100 |
| asphalt B | | | | | | 150 | | | | | | |
| asphalt C | | | | | | | 150 | | | | | |
| mica | 148 | 148 | 148 | 300 | 148 | 148 | 148 | 148 | 300 | 250 | 120 | 200 |
| Physical Properties | | | | | | | | | | | | |
| damping value (%) | 16.8 | 11.9 | 14.1 | 11.3 | 16.5 | 15.3 | 12.2 | 12.5 | 13.2 | 17.0 | 14.4 | 17.6 |
| peak temperature (°C.) | 20 | 40 | 40 | 20 | 40 | 30 | 30 | 30 | 20 | 30 | 40 | 40 |
| adhesion follow-up property | ○ | ○ | ○ | ◎ | ○ | ○ | ○ | ○ | ◎ | △ | △ | X |

What is claimed is:

1. A damping composition comprising 100 parts by weight of a petroleum resin, 100 to 500 parts by weight of asphalt and 90 to 400 parts by weight of mica, the amount incorporated of mica being smaller than the amount incorporated of asphalt, wherein the petroleum resin is selected from the group consisting of (A) isopropenyl petroleum resins obtained by polymerizing isopropenyltoluene alone and isopropenyl petroleum resins obtained by copolymerizing 100 parts by weight of isopropenyltoluene with up to 100 parts by weight of at least one fraction selected from the group consisting of fractions containing unsaturated hydrocarbon fractions having 4 and/or 5 carbon atoms ($C_4$ and/or $C_5$ fractions), obtained as by-products at refining and cracking of petroleum, (B) aromatic hydrocarbon resins obtained by polymerizing fractions having a boiling point of 140° to 280° C., which are composed mainly of aromatic unsaturated hydrocarbons having 9 carbon atoms, (C) aliphatic hydrocarbon resins obtained by polymerizing fractions having a boiling point of −10° to 20° C., which contain, as the main component, olefins and diolefins having 4 carbon atoms ($C_4$ fractions), or fractions having a boiling point of 15° to 60° C., which contain, as the main component, olefins and diolefins having 5 carbon atoms, resin obtained by copolymerizing mixtures of $C_9$ fractions with $C_4$ fractions, $C_5$ fractions and/or cyclodiolefins, resins obtained by copolymerizing vinyl aromatic hydrocarbons with $C_4$ and $C_5$ fractions, and (D) modified aromatic resins obtained by modifying said resins with an α, β-unsaturated carboxylic acid or an anhydride thereof, and resins obtained by hydrogenating said resins, isopropenyltoluene petroleum resins, and aliphatic petroleum resin.

2. A damping composition as set forth in claim 1, wherein the petroleum resin has a softening point of 30° to 160° C. as determined according to the ring and ball method.

3. A damping composition as set forth in claim 1, wherein the petroleum resin is an aromatic petroleum resin.

4. A damping composition as set forth in claim 3, wherein the petroleum resin is an isopropenyltoluene petroleum resin.

5. A damping composition as set forth in claim 4, wherein the isopropenyltoluene petroleum resin contains 20 to 60% of the para-isomer.

6. A damping composition as set forth in claim 1, wherein the asphalt is oil-modified asphalt containing 1 to 20% by weight of an animal or vegetable oil.

7. A damping member formed by molding a composition comprising 100 parts by weight of a petroleum resin, 100 to 500 parts by weight of asphalt and 90 to 400 parts by weight of mica, the amount incorporated of mica being smaller than the amount incorporated of asphalt, wherein the petroleum resin is selected from the group consisting of (A) isopropenyl petroleum resins obtained by polymerizing isopropenyltoluene alone and isopropenyl petroleum resins obtained by copolymerizing 100 parts by weight of isopropenyltoluene with up to 100 parts by weight of at least one fraction selected from the group consisting of fractions containing unsaturated hydrocarbon fractions having 4 and/or 5 carbon atoms ($C_4$ and/or $C_5$ fractions), obtained as by-products at refining and cracking of petroleum, (B) aromatic hydrocarbon resins obtained by polymerizing fractions having a boiling point of 140° to 280° C., which are composed mainly of aromatic unsaturated hydrocarbons having 9 carbon atoms, (C) aliphatic hydrocarbon resins obtained by polymerizing fractions having a boiling point of $-10°$ to 20° C., which contain, as the main component, olefins and diolefins having 4 carbon atoms ($C_4$ fractions), or fractions having a boiling point of 15° to 60° C., which contain, as the main component, olefins and diolefins having 5 carbon atoms, resin obtained by copolymerizing mixtures of $C_9$ fractions with $C_4$ fractions, $C_5$ fractions and/or cyclodiolefins, resins obtained by copolymerizing vinyl aromatic hydrocarbons with $C_4$ and $C_5$ fractions, and (D) modified aromatic resins obtained by modifying said resins with an $\alpha,\beta$-unsaturated carboxylic acid or an anhydride thereof, and resins obtained by hydrogenating said resins, isopropenyltoluene petroleum resins, and aliphatic petroleum resin.

8. A damping member as set forth in claim 7, wherein the thickness is adjusted to 0.1 to 10 mm to improve the adhesion between the molded damping member and a substrate to which the damping member is to be applied.

9. A damping member as set forth in claim 7, wherein petroleum resin has a softening point of 30° to 160° C. as determined according to the ring and ball method.

10. A damping member as set forth in claim 7, wherein the petroleum resin is an aromatic petroleum resin.

11. A damping member as set forth in claim 10, wherein the petroleum resin is an isopropenyltoluene petroleum resin.

12. A damping member as set forth in claim 11, wherein the isopropenyltoluene petroleum resin contains 20 to 60% of the para-isomer.

13. A damping member as set forth in claim 7, wherein the asphalt is oil-modified asphalt containing 1 to 20% by weight of an animal or vegetable oil.

14. A damping member as set forth in claim 8, wherein a defoaming agent is further incorporated in an amount of 0.01 to 0.5 part by weight per 100 parts by weight of the petroleum resin.

15. A process for the preparation of a damping member which comprises melt-kneading 100 parts by weight of a petroleum resin having a softening point of 30° to 40° C., which is obtained by polymerization in the presence of a Friedel-Crafts catalyst, with 100 to 500 parts of asphalt and 90 to 400 parts by weight of mica, the amount incorporated of mica being smaller than the amount incorporated of asphalt, wherein the petroleum resin is selected from the group consisting of (A) isopropenyl petroleum resins obtained by polymerizing isopropenyltoluene alone and isopropenyl petroleum resins obtained by copolymerizing 100 parts by weight of isopropenyltoluene with up to 100 parts by weight of at least one fraction selected from the group consisting of fractions containing unsaturated hydrocarbon fractions having 4 and/or 5 carbon atoms ($C_4$ and/or $C_5$ fractions), obtained as by-products at refining and cracking of petroleum, (B) aromatic hydrocarbon resins obtained by polymerizing fractions having a boiling point of 140° to 280° C., which are composed mainly of aromatic unsaturated hydrocarbons having 9 carbon atoms, (C) aliphatic hydrocarbon resins obtained by polymerizing fractions having a boiling point of $-10°$ to 20° C., which contain, as the main component, olefins and diolefins having 4 carbon atoms ($C_4$ fractions), or fractions having a boiling point of 15° to 60° C., which contain, as the main component, olefins and diolefins having 5 carbon atoms, resin obtained by copolymerizing mixtures of $C_9$ fractions with $C_4$ fractions, $C_5$ fractions and/or cyclodiolefins, resins obtained by copolymerizing vinyl aromatic hydrocarbons with $C_4$ and $C_5$ fractions, and (D) modified aromatic resins obtained by modifying said resins with an $\alpha,\beta$-unsaturated carboxylic acid or an anhydride thereof, and resins obtained by hydrogenating said resins, isopropenyltoluene petroleum resins, and aliphatic petroleum resin.

16. A process for the preparation of a damping member according to claim 15, wherein the petroleum resin is first melt-kneaded with asphalt, and then, mica is incorporated in the kneaded mixture and melt-kneading is conducted.

17. A process for the preparation of a damping member according to claim 15, wherein the melt-kneaded mixture is rolled to a thickness of 0.1 to 10 mm by a calender roll.

* * * * *